(12) United States Patent
Limb et al.

(10) Patent No.: US 7,720,090 B2
(45) Date of Patent: *May 18, 2010

(54) APPARATUSES AND METHODS TO UTILIZE MULTIPLE PROTOCOLS IN A COMMUNICATION SYSTEM

(75) Inventors: John O. Limb, Atlanta, GA (US); Dolors Sala, Atlanta, GA (US); Ajay Chandra V. Gummalla, Atlanta, GA (US); Fred A. Bunn, Roswell, GA (US)

(73) Assignee: Broadcom Corporation, Irvine, CA (US)

(*) Notice: Subject to any disclaimer, the term of this patent is extended or adjusted under 35 U.S.C. 154(b) by 396 days.

This patent is subject to a terminal disclaimer.

(21) Appl. No.: 11/589,918

(22) Filed: Oct. 31, 2006

(65) Prior Publication Data

US 2007/0076717 A1   Apr. 5, 2007

Related U.S. Application Data

(63) Continuation of application No. 09/748,741, filed on Dec. 26, 2000, now Pat. No. 7,164,690.

(60) Provisional application No. 60/171,912, filed on Dec. 23, 1999.

(51) Int. Cl.
*H04B 7/212* (2006.01)
*H04B 1/38* (2006.01)
*H04J 3/16* (2006.01)

(52) U.S. Cl. .................. 370/443; 370/466; 370/468; 375/222

(58) Field of Classification Search ................. 370/401, 370/439, 489, 468, 469, 442, 466, 443, 458, 370/461; 375/222
See application file for complete search history.

(56) References Cited

U.S. PATENT DOCUMENTS

| 4,926,420 A | 5/1990 | Shimizu |
| 6,438,123 B1 | 8/2002 | Chapman |
| 6,459,703 B1 | 10/2002 | Grimwood et al. |
| 6,614,799 B1 | 9/2003 | Gummalla et al. |

(Continued)

FOREIGN PATENT DOCUMENTS

| DE | 198 05 441 | 8/1998 |
| WO | WO 99/30449 | 6/1999 |

OTHER PUBLICATIONS

Smythe C., "Networks and Their Architectures," *Electronics and Communication Engineering Journal*, Institution of Electrial Engineers, London, GB, vol. 3, No. 1, pp. 18-28 (Feb. 1, 1991).
International Search Report issued Oct. 8, 2001 for PCT/US00/35197, 8 pages.

*Primary Examiner*—Nittaya Juntima
(74) *Attorney, Agent, or Firm*—Sterne, Kessler, Goldstein & Fox P.L.L.C.

(57) ABSTRACT

A two way communication system is adapted for compatible inter-operation of a plurality of devices operating in accordance with a plurality of protocols. The communication system includes a first group of one or more remote devices that interface with a local host in accordance with a first protocol and a second group of one or more remote devices that interface with the local host in accordance with a second protocol. The local host includes a protocol processor that identifies transmissions from the first and second groups of remote devices and routes transmissions from the first group of remote devices to a first processor operating in accordance with the first protocol and also routes transmissions from the second group of remote devices to a second processor operating in accordance with the second protocol.

18 Claims, 6 Drawing Sheets

U.S. PATENT DOCUMENTS

| | | |
|---|---|---|
| 6,618,387 B1 | 9/2003 | Liu et al. |
| 6,650,624 B1 | 11/2003 | Quigley et al. |
| 6,683,866 B1 * | 1/2004 | Stanwood et al. ........... 370/350 |
| 6,751,230 B1 | 6/2004 | Vogel et al. |
| 6,765,931 B1 | 7/2004 | Rabenko et al. |
| 6,804,251 B1 | 10/2004 | Limb et al. |

* cited by examiner

-- CONVENTIONAL HFC NETWORK --

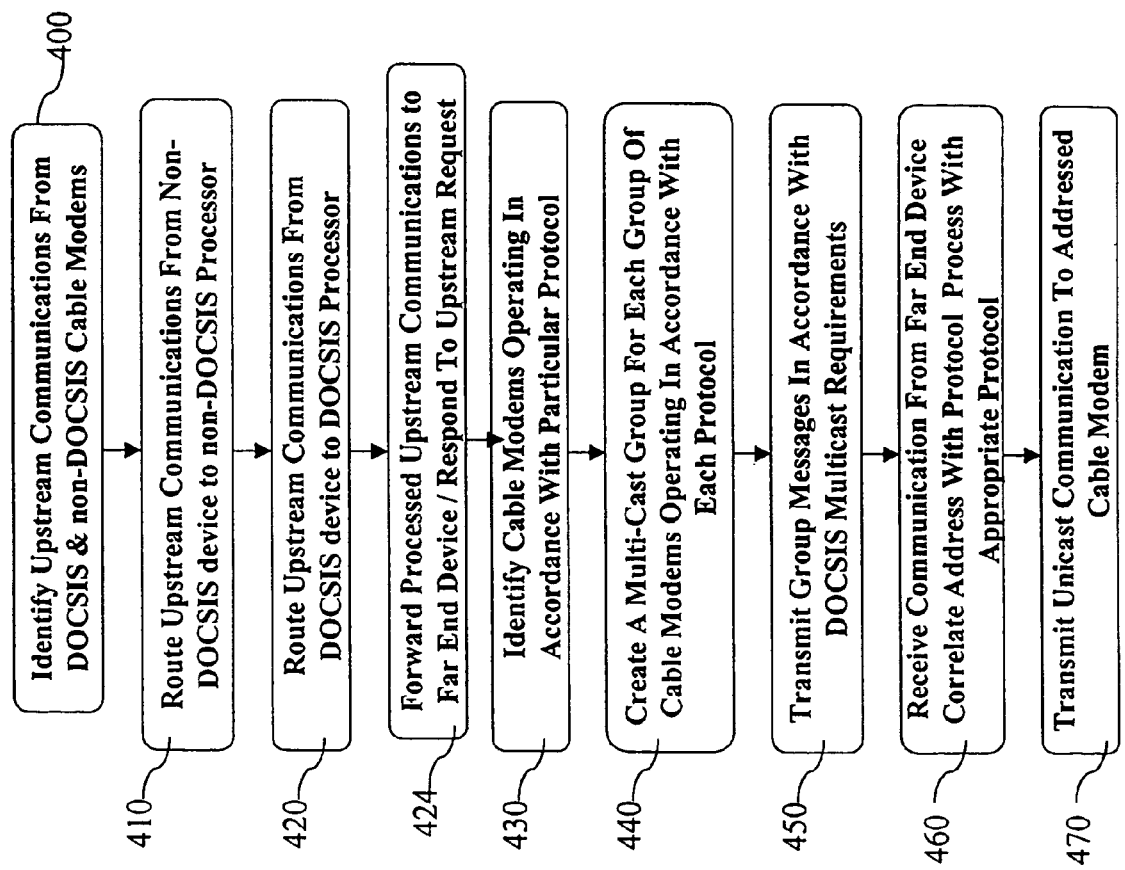

APPARATUSES AND METHODS TO UTILIZE MULTIPLE PROTOCOLS IN A COMMUNICATION SYSTEM

CROSS-REFERENCE TO RELATED APPLICATIONS

This application is a continuation of U.S. patent application Ser. No. 09/748,741 filed Dec. 26, 2000 (now U.S. Pat. No. 7,164,690), which claims the benefit of U.S. Provisional Patent Application No. 60/171,912 filed Dec. 23, 1999, both of which are incorporated herein by reference in their entireties.

BACKGROUND OF THE INVENTION

1. Field of the Invention

The present invention relates generally to broadband multimedia data distribution systems, and more particularly, to a method and apparatus for interfacing non-DOCSIS cable modems with DOCSIS compatible cable modems.

2. Background Art

Traditional dial-up modems provide online access through the public telephone network at up to 56 Kbps (equal to 56,000 bits per second). A cable modem, on the other hand, provides users with high-speed Internet access through a cable television network. A cable modem is capable of providing data rates as high as 56 Mbps, and is thus suitable for high speed Internet access, digital television (such as pay-per-view) and digital telephony.

The Data Over Cable Service Interface Specification (DOCSIS) protocol was developed to ensure that cable modem equipment built by a variety of manufacturers is compatible, as is the case with traditional dial-up modems. However, DOCSIS compliant systems, as currently defined, do not efficiently transmit many types of data, such as, for example, voice.

Therefore, it would be desirable to provide a method and apparatus for operating a proprietary MAC protocol in customer premise equipment, such as, for example, a cable modem, that overcomes the limitations of the DOCSIS protocol, and interoperates with DOCSIS compatible cable modems resident on the same mixed network.

SUMMARY OF THE INVENTION

In one aspect of the present invention a method for networking a central controller with a first group of one or more remote devices operating in accordance with a first protocol and a second group of one or more remote devices operating in accordance with a second protocol, includes identifying transmissions from said first and second groups of remote devices, routing transmissions from said first group of remote devices to a first processor operating in accordance with the first protocol within the central controller, and routing transmissions from the second group of remote devices to a second processor operating in accordance with the second protocol within the central controller.

In another aspect of the present invention a method for networking a cable modem termination system with a first group of one or more cable modems operating in accordance with a proprietary protocol and a second group of one or more cable modems operating in accordance with DOCSIS protocol, includes identifying transmissions from the first group and second group of cable modems, routing transmissions from the first group of cable modems to a first processor that operates in accordance with the proprietary protocol within the cable modem termination system, and routing transmissions from the second group of cable modems to a second processor that operates in accordance with the DOCSIS protocol within the cable modem termination system.

In a further aspect of the present invention, a two way communication system cable of compatible inter-operation of a plurality of devices operating in accordance with a plurality of protocols. The communication system includes a first group of one or more remote devices that interface with a local host in accordance with a first protocol and a second group of one or more remote devices that interface with the local host in accordance with a second protocol. The local host includes a protocol processor that identifies transmissions from the first and second groups of remote devices and routes transmissions from the first group of remote devices to a first processor operating in accordance with the first protocol and also routes transmissions from the second group of remote devices to a second processor operating in accordance with the second protocol.

BRIEF DESCRIPTION OF THE DRAWINGS

These and other features, aspects, and advantages of the present invention will become better understood with regard to the following description, appended claims, and accompanying drawings where:

FIG. 5 is a flow diagram demonstrating the integration of a non-DOCSIS cable modem into a DOCSIS compatible cable modem system in accordance with an exemplary embodiment of the present invention.

DETAILED DESCRIPTION OF THE INVENTION

An exemplary embodiment of the present invention provides a method for operating a proprietary media access control (MAC) protocol in a non-DOCSIS cable modem. In the described exemplary embodiment, the non-DOCSIS cable modem interoperates with DOCSIS compatible cable modems resident on the same network. The DOCSIS protocol defines a series of interface specifications that standardize high speed packet based communications on a cable television system. Compliance with the DOCSIS protocol ensures conforming hardware will interoperate to permit transparent bi-directional transfer of Internet Protocol (IP) traffic, as well as other traffic, between a cable headend and customer premise equipment over an all-co-axial or hybrid-fiber/coax (HFC) cable network. In order to appreciate the advantages of the present invention, it will be beneficial to describe the invention in the context of an exemplary bi-directional communication network, such as, for example, a HFC network.

Figure 1:
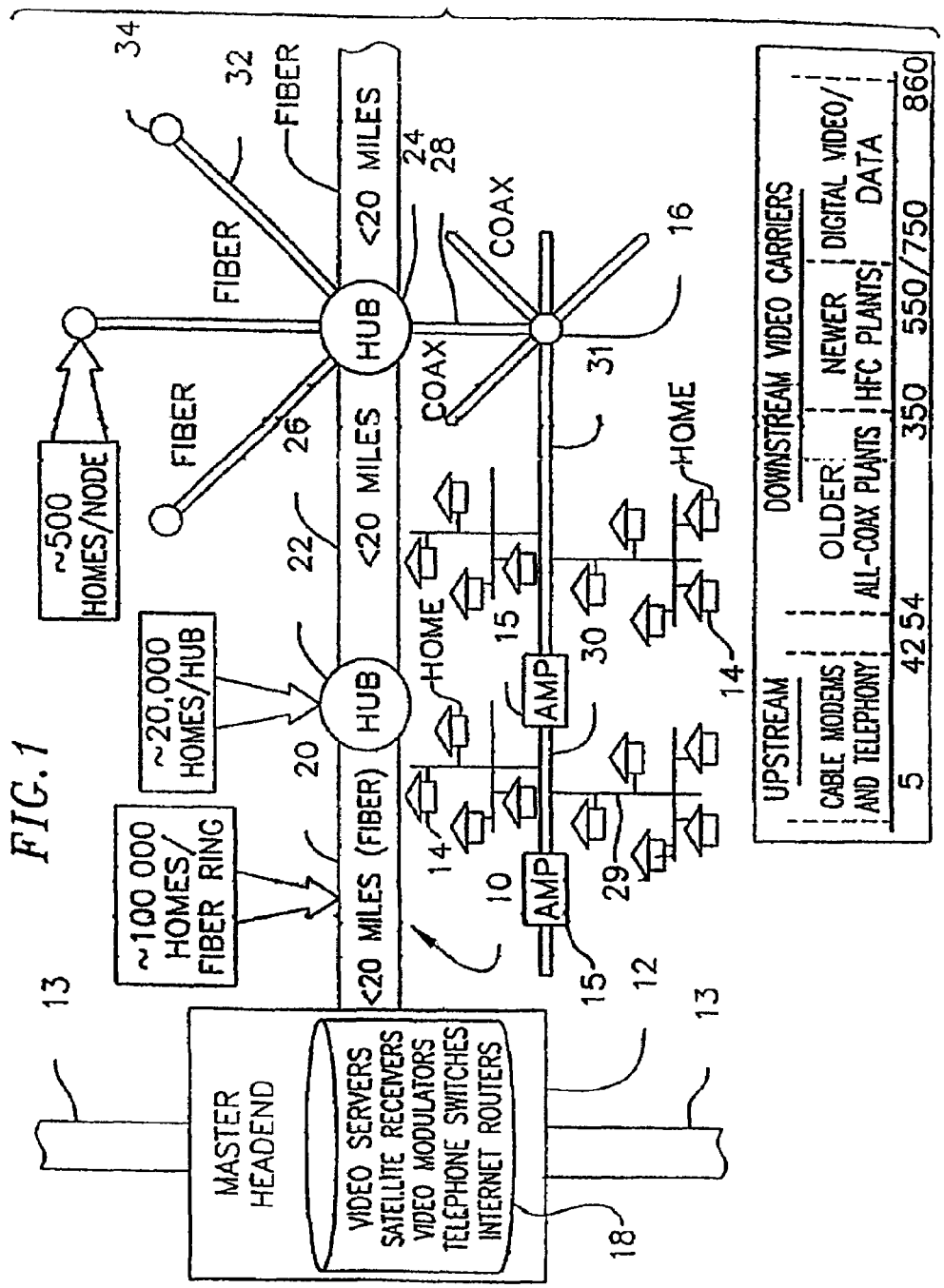
FIG. 1 is a schematic diagram of a hybrid fiber coaxial (HFC) network showing typical pathways for data transmission between the headend (which contains the cable modem termination system) and a plurality of homes (each of which contain a cable modem)

Referring now to FIG. 1, a HFC network facilitates the transmission of data between a headend 12, which includes at least one cable modem termination system, and a number of homes 14, each of which contains a cable modem. As used herein, the CMTS is defined to include that portion of a headend which facilitates communication with a plurality of cable modems. A typical cable modem termination system includes a burst receiver, a continuous transmitter and a medium access control (MAC) as disclosed in commonly owned U.S. patent application Ser. No. 09/574,558 (now U.S. Pat. No. 6,650,624), entitled "CABLE MODEM APPARATUS AND METHOD", filed May 19, 2000, the content of which is incorporated fully herein by reference. Such hybrid fiber coaxial networks are commonly utilized by cable providers to provide Internet access, cable television, pay-per-view and the like to subscribers.

Approximately 500 homes 14 are in electrical communication with each node 16, 34 of the hybrid fiber coaxial network 10, typically via coaxial cables 29, 30, 31. Amplifiers 15 facilitate the electrical connection of the more distant homes 14 to the nodes 16, 34 by boosting the electrical signals so as to desirably enhance the signal-to-noise ratio of such communications and by then transmitting the electrical signals over coaxial cables 30, 31. Coaxial cable 29 electrically interconnects the homes 14 with the coaxial cables 30, 31, which extend between amplifiers 15 and nodes 16, 34. Each node 16, 34 is electrically connected to a hub 22, 24, typically via an optical fiber 28, 32. The hubs 22, 24 are in communication with the headend 12, via optical fibers 20, 26. Each hub is typically capable of facilitating communication with approximately 20,000 homes 14.

The optical fibers 20, 26 extending intermediate the headend 12 and each hub 22, 24 defines a fiber ring which is typically capable of facilitating communication between approximately 100,000 homes 14 and the headend 12. The headend 12 may include video servers, satellite receivers, video modulators, telephone switches and/or Internet routers 18, as well as the cable modem termination system. The headend 12 communicates via transmission line 13, that may be a T1 or T2 line, with the Internet, other headends and/or any other desired device(s) or network.

Figure 2:
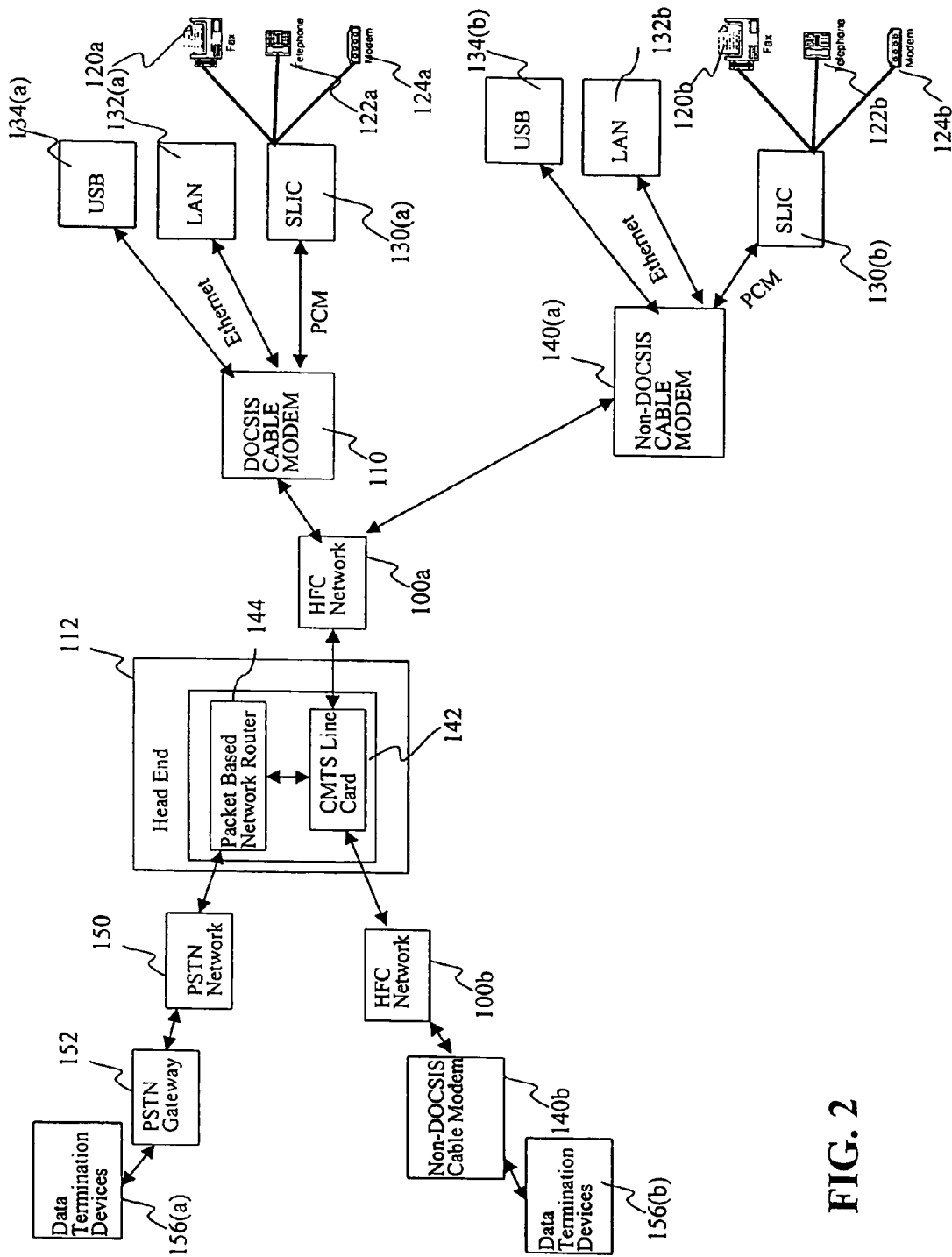
FIG. 2 is a schematic diagram of a cable system having a cable modem operating in accordance with a proprietary non-DOCSIS compatible protocol integrated with DOCSIS compatible cable modem system in accordance with an exemplary embodiment of the present invention.

An exemplary embodiment of the present invention allows a single CMTS to support on-line and off-line bidirectional communication between non-DOCSIS cable modems as well as between DOCSIS compatible cable modems and a variety of far end data termination devices. An exemplary topology is shown in FIG. 2, wherein a DOCSIS compatible cable modem 110 provides an interface to HFC network 100a for a fax machine 120a, telephone 122a and modem 124a through a subscriber loop interface circuit (SLIC) 130a. A non-DOCSIS cable modem 140 may also provide an interface to the HFC network 100a for a fax machine 120b, a telephone 122b and a modem 124b or other telephony, multi-media or computing devices through a subscriber loop interface circuit (SLIC) 130b. A local area network (LAN) 132a, 132b and a universal synchronous bus (USB) 134a, 134b may also be provided access to the HFC network 100a via the DOCSIS and non-DOCSIS cable modems respectively.

The near-end HFC network 100a is coupled to a CMTS line card 142 in the headend 112. The CMTS line card 142 is coupled to a packet based network router 144 to determine whether the communication will be transported via a far end HFC network 100b, a far end PSTN network 150 or the Internet. In the case of communications over a far end PSTN network a PSTN gateway 152 provides an interface between a far end data termination device 156a and the PSTN network 150 connected to the headend 112.

In the case of a far end HFC network 100b, a cable modem, such as, for example, a non-DOCSIS cable modem 140b, provides an interface between a far end data termination devices 156b and the far end HFC network 100b connected to the headend 112. As those skilled in the art will appreciate, the far end data termination devices 156a and 156b may include a variety of telephony and data devices including a telephone, fax machine, and modem via a SLIC or audio processor, as well as a LAN or USB.

The packet based network router 144 facilitates communication between the near end data devices and off-line far end data terminating devices 156a via a circuit switched network such as the public switched telephone network (PSTN) 150 and the PSTN gateway 152. Data termination devices include by way of example, analog and digital phones, ethernet phones, Internet Protocol phones, fax machines, data modems, cable modems, interactive voice response systems, PBXs, key systems, and any other conventional telephony devices known in the art. One skilled in the art will appreciate that the described method of interfacing devices operating in accordance with different protocols is not limited to cable modems on a HFC network. Rather the present invention may be used to interface network gateways, set top boxes or other multimedia devices on a mixed network. Therefore, the described hybrid fiber coaxial network 100a is by way of example and not a limitation.

The multimedia cable network system (MCNS) DOCSIS radio frequency interface specification (SP-RFI-I02-971008) protocol specifies a time-division multiple access (TDMA) protocol for the upstream transmission of data packets from cable modems to a cable modem termination system. In order to accomplish TDMA for upstream communication, it is necessary to assign time slots within which cable modems having a message to send to the cable modem termination system are allowed to transmit. The CMTS assigns time slots in accordance with requests that are placed in a request contention area in the upstream data path.

The CMTS responds to such requests from the cable modems with a logical message (MAP) that is broadcast to all of the cable modems on a particular frequency channel. The MAP message specifies the upstream framing structure, so as to provide individual time slots within which each cable modem may transmit. The MAP specifies which cable modems may transmit, when they may transmit, and how, e.g., what modulation type they may utilize to transmit.

Each cable modem is typically identified by one or more station or service identifiers (SID). The MAP message specifies which SID or cable modem has control of upstream communications on a particular frequency channel during each TDMA time slot. The MAP message also specifies the time at which the time slot begins and which interval usage code or burst type is to be used. When the appropriate TDMA time slot arrives (in time) a cable modem sends a burst of information, e.g., a frame of voice or data, to the cable modem termination system.

In accordance with the DOCSIS time-division multiple access protocol, all devices (DOCSIS compatible or otherwise) operating on a DOCSIS network simultaneously receive MAP messages and broadcast requests in the request contention region. Thus, to compatibly interoperate on a shared access network with DOCSIS compatible devices, a device operating according to a non-DOCSIS proprietary protocol must not interfere with the correct operation of the DOCSIS compatible devices (e.g. cable modems and .CMTS). In addition, communications between DOCSIS compatible devices preferably do not interfere with the correct operation of a device operating in accordance with a non-DOCSIS protocol.

Therefore, upstream communications on a mixed network that originate from a device operating in accordance with a non-DOCSIS protocol are preferably distinguished from communications that originate from DOCSIS compatible devices. In operation, the CMTS may therefore identify and direct upstream non-DOCSIS transmissions to a compatible processing unit in the CMTS and DOCSIS transmissions to a DOCSIS compatible processing unit in the CMTS. Further in the downstream direction, a CMTS is preferably able to communicate with a specific non-DOCSIS device or all non-DOCSIS devices such that the communications will be ignored or discarded by the DOCSIS compatible devices. Similarly, downstream communications from the CMTS to DOCSIS compatible devices are preferably ignored or discarded by the non-DOCSIS devices.

Figure 3:
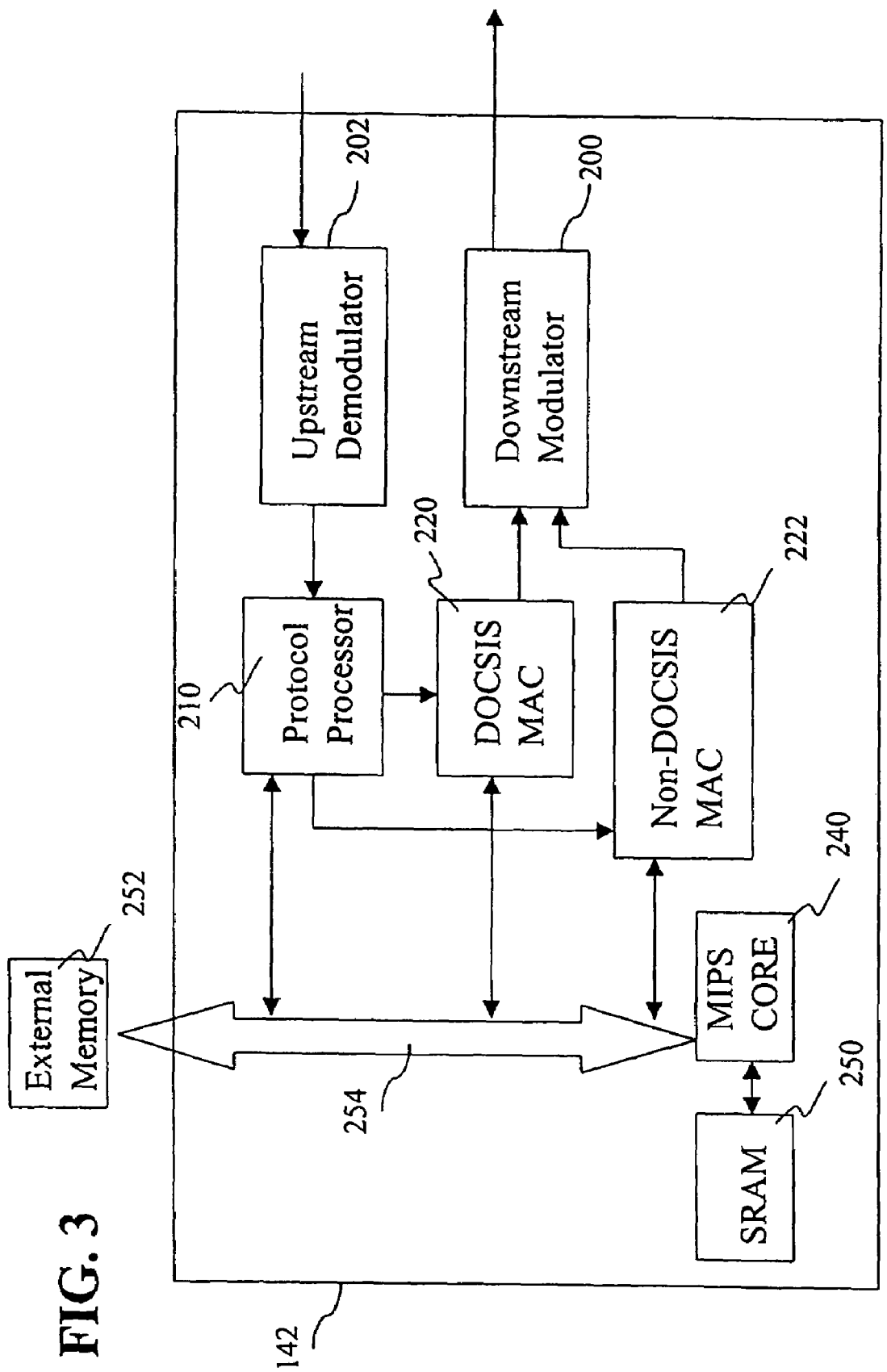
FIG. 3 is a system block diagram of an exemplary cable modem termination system capable of supporting device operating in accordance with two or more protocols in accordance with a preferred embodiment of the present invention.

Referring to FIG. 3, cable modem termination system 142 includes a downstream modulator 200 for transmitting information such as, for example voice, data, control or service messages to the cable modems and an upstream demodulator 202 for receiving communications from the cable modems. Downstream modulator 200 may utilize, for example, 64 QAM or 256 QAM in a frequency band in the range of 54 to 860 MHz to provide a data rate of up to 56 Mbps. Upstream demodulator 202 may use either QPSK or 16 QAM, in a frequency range of 5 MHz to 42 MHz, to provide a data rate of up to 10 Mbps.

In the described exemplary CMTS, a MIPS core 240 in conjunction with its resident SRAM 250 and external memory 252, provide contention resolution and scheduling functions to maximize the efficiency of the network by adjusting the number of time slots in accordance with network traffic patterns. The MIPS core also directs data traffic on bus 254. Furthermore, much of the data transmitted and received by the CMTS requires extensive processing and formatting. The MIPS core 240 is responsible for this processing and formatting. For example, the MIPS core manages the conversion of data between 64-QAM, QPSK, and the digital packet format of the router interface. Further, MIPS core 240 interprets management messages and provides basic database management functions.

In the described exemplary embodiment, a protocol processor 210 controls the interface between the physical layer (i.e. upstream demodulator and downstream modulator) and DOCSIS compatible and non-DOCSIS compatible media access controllers 220 and 222 respectively. The protocol processor 210 identifies DOCSIS compatible upstream and downstream communications and routes them to the DOCSIS MAC 220 for processing. Likewise the protocol processor 210 identifies non-DOCSIS compatible upstream and downstream communications and routes them to the non-DOCSIS MAC 222 for processing.

Media access controllers (MAC) 220 and 222 encapsulate data received from a data network interface with the appropriate MAC address of the cable modems on the system. Each cable modem on the system (not shown) has its own MAC address. Whenever a new cable modem is installed, its address is registered with the CMTS. The MAC address is necessary to distinguish upstream data from the cable modems since all the modems share a common upstream path, and so that the CMTS transmits downstream communications to the proper cable modem. Thus, each data packet, regardless of protocol, is mapped to a particular MAC address.

Figure 4A:
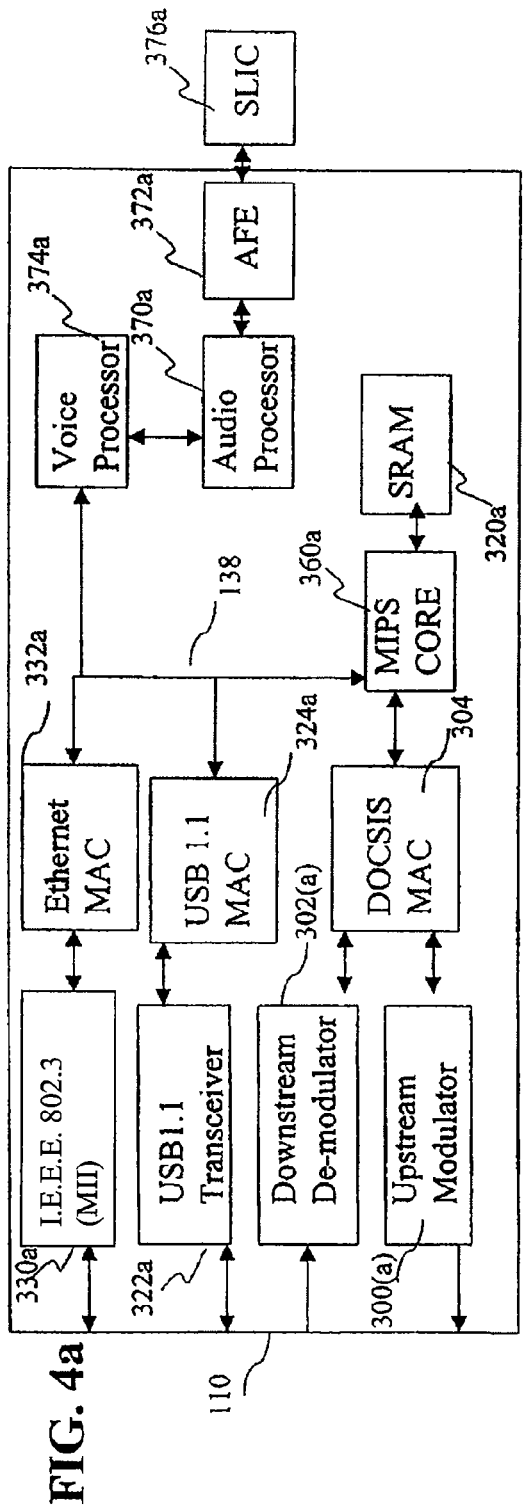
FIG. 4*a* is a system block diagram of a DOCSIS compatible cable modem in accordance with a preferred embodiment of the present invention.
Figure 4B:
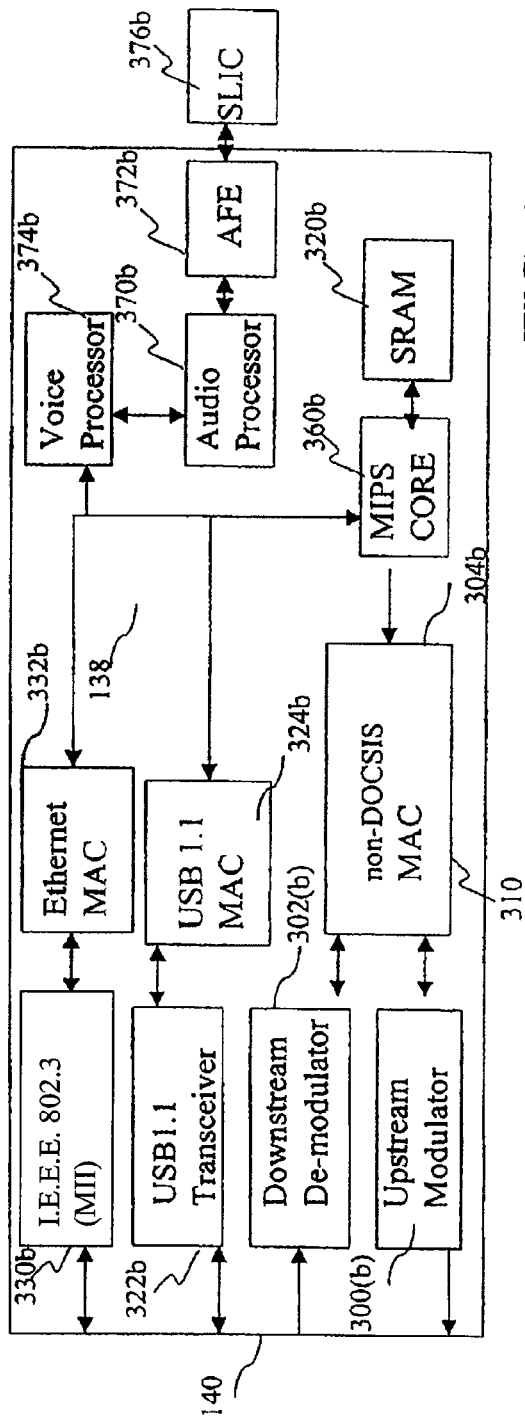
FIG. 4*b* is a system block diagram of a cable modem operating in accordance with a proprietary protocol in accordance with a preferred embodiment of the present invention.

A DOCSIS and non-DOCSIS cable modem are shown schematically in FIGS. 4a and 4b respectively. The DOCSIS cable modem provides a DOCSIS compliant, single chip solution, as disclosed in commonly owned U.S. patent application Ser. 09/548,400 (now U.S. Pat. No. 6,765,931), entitled "GATEWAY WITH VOICE" filed Apr. 13, 2000, the contents of which are incorporated herein by reference as if set forth in full. The DOCSIS cable modem 110 provides integrated functions for communicating with far end devices via the CMTS (not shown). The non-DOCSIS cable modem 140 also provides integrated functions for communicating with far end data terminating devices. Non-DOCSIS cable modem 140 may operate in accordance with a non-DOCSIS compliant proprietary protocol as described in commonly owned U.S. patent application Ser. No. 09/427,792 (now U.S. Pat. No. 6,804,251), entitled "SYSTEM AND METHOD FOR MULTIIPLEXING DATA FROM MULTIPLE SOURCES", filed Oct. 27, 1999, the contents of which are incorporated herein by reference as if set forth in full.

The DOCSIS cable modem 110 and the non-DOCSIS cable modem 140 may utilize common PHY elements. For example, QPSK upstream modulators 300a, 300b may be used to transmit data to a far end data terminating device and QAM downstream demodulators 302a, 302b may receive data from the far end data terminating device via the CMTS. However, upstream modulator 300a and downstream demodulator 302a in the DOCSIS cable modem 110, interface with a DOCSIS MAC 304, while upstream modulator 300b and downstream demodulator 302b in the non-DOCSIS cable modem 140 interface with a non-DOCSIS MAC 310.

DOCSIS MAC 304 implements the downstream portions of the DOCSIS protocol. DOCSIS MAC extracts DOCSIS MAC frames from MPEG-2 frames, processes MAC headers, and filters and processes messages and data. Downstream data packets and message packets may then be placed in system memory 320 via an internal system bus (ISB). DOCSIS MAC 304 and non-DOCSIS MAC 310 also control the upstream transmission parameters and encapsulate data received from peripheral signal sources with the appropriate header information including a service identifier (SID).

Cable modems 110 and 140 may accept information packets from a plurality of signal sources. For example, universal serial bus (USB) transceivers 322a, 322b and USB MACs 324a, 324b provide transparent, bi-directional IP traffic between devices operating on a USB such as for example a PC workstation, server printer or other similar devices and the far end data terminating device. Additionally, an I.E.E.E. 802.3 compliant media independent interface (MII) 330a, 330b in conjunction with an Ethernet MAC 332a, 332b may also be included to provide bi-directional data exchange between communications devices such as, for example a number of PCs and or Ethernet phones and the far end data terminating device.

In the described exemplary cable modems 110 and 140, a MIPS core 360a, 360b in conjunction with resident SRAM 320a, 320b, manages the conversion of data between 64-QAM, QPSK, and the digital packet format of the various peripheral devices. Further, MIPS core 360 interprets management messages and provides basic database management functions.

Cable modems 110, 140 may further include an internal audio processor 370a, 370b with an analog front end 372a, 372b that interface a voice processor 374a, 374b with external subscriber line interface circuits (SLICs) 376a, 376b for bidirectional exchange of voice signals. The voice processor 374a, 374b includes an encoder and decoder system (not shown) that may provide, for example, delay compensation, voice encoding and decoding, DTMF generation and detection, call progress tone generation and detection, comfort noise generation and lost frame recovery.

The audio processor 370a, 370b may include programable elements that implement filters and other interface components for a plurality of voice channels. In the transmit mode the analog front end 372a, 372b accepts an analog voice signal from SLIC 376a, 376b, digitizes the signal and forwards the digitized signal to the audio processor 370.

The audio processor 370a, 370b decimates the digitized signal and conditions the decimated signal to remove far end echos. As the name implies, echos in telephone systems is the return of the talker's voice resulting from the operation of the hybrid with its two-four wire conversion. The audio processor 370a, 370b can apply a fixed gain/attenuation to the conditioned signal and forwards the gain adjusted signal to the voice processor 374a, 374b via the PCM interface. In the receive mode the audio processor accepts a voice signal via a PCM interface from the voice processor and applies a fixed gain/attenuation to the received signal. The gain adjusted signal is then interpolated from 8 kHz to 96 kHz before being D/A converted for communication via a SLIC interface to a telephony device.

In one embodiment, non-DOCSIS MAC 310 may implement a proprietary protocol that provides for efficient multiplexing of voice and data for bi-directional communication over the HFC network. The non-DOCSIS cable modem may evaluate the relative efficiency of data transmission for a given grant region given the information packets currently waiting to be transmitted. The non-DOCSIS cable modem preferably evaluates the relationship between signal sources, the size of a packet relative to the size of the grant region, transmission priorities, and other knowledge regarding the data packets and the state of the network. Further, to maximize efficiency, the cable modem may concatenate or fragment information packets. In one embodiment, information packets from any signal source may be concatenated with information from any other, and transmitted within the same grant region. Further, the described exemplary non-DOCSIS cable modem may transmit an information packet or fragment thereof in a grant region assigned to different information packet.

Referring to FIG. 5, the CMTS identifies and processes upstream communications from, and downstream communications to, the DOCSIS and non-DOCSIS cable modems. In one embodiment, service identifiers (SIDs) in the frame header of upstream communications may in part serve to identify DOCSIS compatible and non-DOCSIS compatible devices. A MAC frame is the basic unit of transfer between the MAC sublayers at the CMTS and the cable modems. The same basic structure is used in both the upstream and downstream directions. A MAC frame comprises a MAC header that identifies the content of the MAC frame and an optional packet data unit (PDU).

Figure 6:
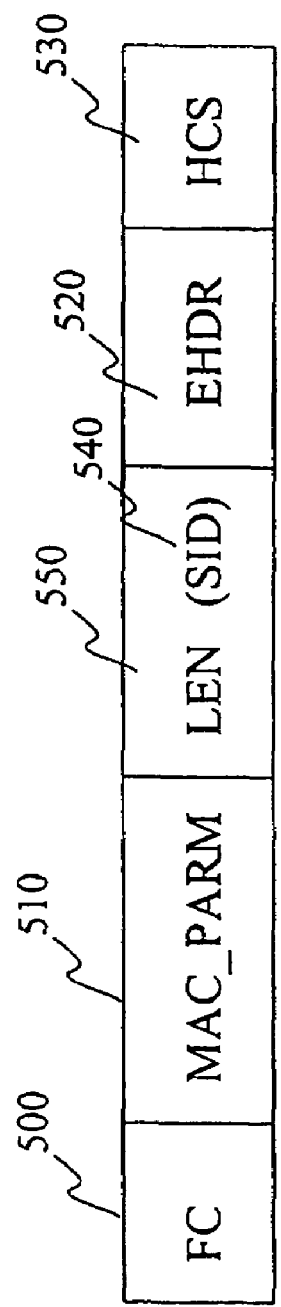
FIG. 6 is graphical illustration of a MAC frame.

MAC headers comply with the header format illustrated in FIG. 6. Generally the MAC headers include a frame control field (FC) 500 that identifies the type of MAC header, as well as a MAC control field 510, an optional extended header field 520 and a header check sequence 530 to ensure the integrity of the MAC header. Broadly speaking there are two types of frames transmitted on the upstream channel by the cable modems to the CMTS. Namely, contention minislot requests that include one or more SIDs 540 in the header structure and all other types of frames that typically do not include a service identifier but rather include the length 550 of the MAC frame.

In an exemplary embodiment of the present invention, each device on the network is initially assigned a primary service identifier (PSID), that serves to identify the traffic characteristics and scheduling requirements for that cable modem. In addition, each device is also assigned additional SIDs identifying the device as being DOCSIS compatible or non-DOCSIS compatible. The DOCSIS and non-DOCSIS MACs of the cable modems embed the additional SIDs in each contention minislot frame. The protocol-processor in the CMTS may then identify requests from DOCSIS and non-DOCSIS compatible devices in accordance with the embedded SIDs.

Referring back to FIG. 5, in operation, the CMTS may therefore direct requests in the contention request region from devices having non-DOCSIS compatible SIDs to a corresponding non-DOCSIS processor within the CMTS 410. Similarly, the CMTS may direct requests from devices having DOCSIS compatible SIDs to a corresponding DOCSIS processor within the CMTS 420. The CMTS may then appropriately respond to such requests with a grant of bandwidth during which the cable modems may transmit 424. In addition, in the described exemplary embodiment, collisions between two or more packets at the CMTS are ignored having no effect on CMTS processing.

However, in the grant region cable modems transmit transport frames on the upstream channel that do not have a SID embedded in the frame header. Rather, the SID field is replaced by a field identifying the length of the packet data unit. Therefore, the CMTS can not directly identify the cable modem that transmitted a particular frame by examining that frame. However, upstream transmissions that do not have a SED field are transmitted in accordance with a minislot assignment from the CMTS. The scheduler in the MIPS core of the CMTS therefore knows a priori which device transmitted each frame in a particular set of minislots. Thus, the CMTS may also identify upstream communications in the grant region transmitted by both DOCSIS compatible and non compatible devices.

In operation, the CMTS may therefore direct upstream communications in the grant region from non-DOCSIS compatible devices to a corresponding non-DOCSIS processor within the CMTS. Similarly, the CMTS may direct upstream communications in the grant region from DOCSIS compatible devices to a corresponding DOCSIS processor within the CMTS. The appropriate processor within the CMTS therefore processes upstream communications in the grant region and forwards those communications to the addressed far end device 424. The CMTS may therefore insulate each upstream communication from potential interference from a non-compatible device. The grant region of the upstream allocated to non-DOCSIS devices is not mapped by the DOCSIS system mapper.

In the downstream direction the DOCSIS protocol requires the communication of a single broadcast messages, such as, for example, MAP messages, to each device on the network. To comply with this requirement a CMTS in a system having groups of devices operating in accordance with two or more different protocols may utilize the DOCSIS multicast mechanism to communicate with each device in a particular group. For example, the CMTS may first create a multicast group for the cable modems operating in accordance with each different protocol 440. The CMTS may then communicate with a group of devices operating in accordance with a particular protocol by transmitting a packet using a multicast group 450 that includes each device within that group.

In the described exemplary embodiment, multicast packets addressed to non-DOCSIS compatible devices conform with the requirements for a DOCSIS multicast packet so as not to produce an error condition in a DOCSIS compatible device. Multicast communications addressed to non-DOCSIS compatible groups however, are ignored by DOCSIS compatible devices since they are not part of the multicast group. Similarly, multicast packets addressed to a group of DOCSIS compatible devices will be ignored by non-DOCSIS devices that are not part of the multicast group.

In the described exemplary embodiment, downstream communications with a group of non-DOCSIS compatible devices may be done in the payload of the multicast frame. For example, control information intended for a group of non-DOCSIS devices may be transmitted to that group in the payload of a multicast frame. Similarly, the payload of a non-DOCSIS multicast frame may be used to transmit MAP messages downstream to allocate upstream capacity to devices within the non-DOCSIS compatible group.

Further, the CMTS may correlate the destination address of far end communications with the protocol of the addressed device 460. The CMTS may therefore, route far end communications to the appropriate processor within the CMTS for processing in accordance with the protocol of the addressed device. The CMTS may then forward the processed downstream communication having a unicast MAC address to the downstream modulator for communication to the individual addressed device 470. Downstream unicast communications are therefore ignored by all other devices. Thus, the CMTS may also communicate downstream with individual devices operating in accordance with a non-DOCSIS protocol without interfering with the operation of DOCSIS compatible devices on the same mixed network. Therefore, a bi-directional communication network operating in accordance with the present invention may support devices operating in accordance with a plurality of protocols for efficient utilization of network bandwidth.

Although a preferred embodiment of the present invention has been described, it should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A central controller comprising:
a media access controller configured to transmit a first group message via a first multicast transmission to a first group of one or more remote devices operating in accordance with a first protocol and to transmit a second group message via a second multicast transmission to a second group of one or more remote devices operating in accordance with a second protocol, the first and second group messages assigning one or more time slots on the same logical upstream channel during which the respective first and second groups of one or more remote devices may transmit information to a central device;
a first processor operating in accordance with the first protocol;
a second processor operating in accordance with the second protocol; and
a protocol processor configured to distinguish transmissions from the first group of one or more remote devices from transmissions from the second group of one or more remote devices based on the time slot assignments, the protocol processor further configured to route the transmissions from the first group of one or more remote devices to the first processor and to route the transmissions from the second group of one or more remote devices to the second processor.

2. The central controller of claim 1, wherein the protocol processor is further configured to identify transmissions from the first group of one or more remote devices in accordance with a first embedded identifier in the transmissions from the first group and to identify transmissions from the second group of one or more remote devices in accordance with a second embedded identifier in the transmissions from the second group.

3. The central controller of claim 2, wherein the transmissions from the first and second groups of one or more remote devices include bandwidth requests transmitted in a contention request region.

4. The central controller of claim 3, wherein the media access controller is further configured to transmit bandwidth grants to the first and second groups of one or more remote devices in response to the bandwidth requests.

5. The central controller of claim 1, wherein the protocol processor is further configured to route communications addressed for the first group of one or more remote devices to the first processor and to route communications addressed for the second group of remote devices to the second processor, and wherein the media access controller is further configured to transmit the communications addressed for the first group of one or more remote devices to the first group and to transmit the communications addressed for the second group of one or more remote devices to the second group.

6. A cable modem termination system (CMTS) comprising:
a media access controller configured to transmit a first group message via a first multicast transmission to a first group of one or more cable modems operating in accordance with a proprietary protocol and to transmit a second group message via a second multicast transmission to a second group of one or more cable modems operating in accordance with a DOCSIS protocol, the first and second group messages assigning one or more time slots on the same logical upstream channel during which the respective first and second groups of one or more cable modems may transmit information to the CMTS;
a first processor operating in accordance with the proprietary protocol;
a second processor operating in accordance with the DOCSIS protocol; and
a protocol processor configured to distinguish transmissions from the first group of one or more cable modems from transmissions from the second group of one or more cable modems based on the time slot assignments, the protocol processor further configured to route the transmissions from the first group of one or more cable modems to the first processor and to route the transmissions from the second group of one or more cable modems to the second processor.

7. The CMTS of claim 6, wherein the protocol processor is further configured to identify transmissions from the first group of one or more cable modems in accordance with a first embedded identifier in the transmissions from the first group and to identify transmissions from the second group of one or more cable modems in accordance with a second embedded identifier in the transmissions from the second group.

8. The CMTS of claim 7, wherein the transmissions from the first and second groups of one or more cable modems include bandwidth requests transmitted in a contention request region.

9. The CMTS of claim 8, wherein the media access controller is further configured to transmit bandwidth grants to the first and second groups of one or more cable modems in response to the bandwidth requests.

10. The CMTS of claim 6, wherein the protocol processor is further configured to route communications addressed for the first group of one or more cable modems to the first processor and to route communications addressed for the second group of cable modems to the second processor, and wherein the media access controller is further configured to transmit the communications addressed for the first group of one or more cable modems to the first group and to transmit the communications addressed for the second group of one or more cable modems to the second group.

11. A media access controller (MAC) in a remote device, comprising:
MAC logic configured to embed at least one service identifier (SID) associated with a first protocol of a plurality of protocols in an upstream transmission to enable a central controller to determine that the upstream transmission is associated with the first protocol;
an input to receive a multicast message that assigns one or more time slots during which the remote device is allowed to transmit information corresponding with the first protocol to the central controller in accordance with a second protocol of the plurality of protocols; and
an output to transmit the information corresponding with the first protocol among the one or more time slots in accordance with the second protocol to enable the central controller to associate the information corresponding with the first protocol with the remote device.

12. The MAC of claim 11, wherein the upstream transmission includes a bandwidth request.

13. The MAC of claim 12, wherein the multicast message includes a bandwidth grant corresponding with the bandwidth request.

14. The MAC of claim 11, wherein the MAC logic is configured to ignore multicast messages that assign one or more time slots during which information corresponding with the second protocol is allowed to be transmitted.

15. A media access controller (MAC) in a cable modem, comprising:
MAC logic configured to embed at least one service identifier (SID) associated with a proprietary protocol in an upstream transmission to enable a cable modem termination system (CMTS) to determine that the upstream transmission is associated with the proprietary protocol;
an input to receive a multicast message that assigns one or more time slots during which the cable modem is allowed to transmit information corresponding with the proprietary protocol to the CMTS in accordance with a Data Over Cable Service Interface Specification (DOCSIS) protocol that is different from the proprietary protocol; and
an output to transmit the information corresponding with the proprietary protocol among the one or more time slots in accordance with the DOCSIS protocol to enable the CMTS to associate the information corresponding with the proprietary protocol with the cable modem.

16. The MAC of claim 15, wherein the upstream transmission includes a bandwidth request.

17. The MAC of claim 16, wherein the multicast message includes a bandwidth grant corresponding with the bandwidth request.

18. The MAC of claim 15, wherein the MAC logic is configured to ignore multicast messages that assign one or more time slots during which information corresponding with the DOCSIS protocol is allowed to be transmitted.

* * * * *